United States Patent Office 2,733,142
Patented Jan. 31, 1956

2,733,142

PURIFICATION OF NICKEL POWDER

John W. Glenn, Kenmore, N. Y., assignor to the United States of America as represented by the United States Atomic Energy Commission No Drawing. Application April 20, 1948,
Serial No. 22,259

3 Claims. (Cl. 75—119)

This invention relates to the purification of nickel powder and more particularly to the removal of free iron from nickel powder by washing it with a solution of an aliphatic acid selected from the group consisting of formic acid, acetic acid, lactic acid and tartaric acid.

In the manufacture of nickel powder a certain amount of free iron may be introduced as a contaminant from the apparatus used in its production. For instance, when nickel powder is made by grinding nickel shot in a ball mill a certain amount of iron powder produced by attrition of the balls becomes mixed with the nickel powder that is being produced.

It is an object of the present invention to remove mechanically mixed iron from nickel powders. A further object of the invention is to chemically remove free iron from a nickel powder without losing a substantial amount of the nickel powder being purified. Other objects will appear hereinafter.

These objects are accomplished by the present invention in accordance with which a nickel powder that is contaminated with free iron is washed by a 1 to 20% aqueous solution of an aliphatic acid selected from the group consisting of formic acid, acetic acid, lactic acid and tartaric acid at a temperature in the range from 20 to 100° C. The most efficient removal of iron and the least attack on the nickel occur when 2 to 5% aqueous formic acid solutions are employed at room temperature (20 to 35° C.).

The following example illustrates but does not limit the invention.

EXAMPLE

Nickel powder is pulped with twice its weight of a 5% aqueous solution of formic acid for 2 hours at 30° C. The slurry is then filtered on a centrifuge or on a vacuum filter, and the filter cake is washed with distilled water. The filter cake is then dried in a vacuum or airstream drier at 125–150° C. or on an infra-red heated traveling belt. The dried cake is then broken up in a micropulverizer, and the process is complete. The following table indicates typical results obtained on various nickel powders by following the procedure outlined in this example.

Table

| Percent of iron in powder before treatment | Percent of iron in powder after treatment |
|---|---|
| 0.33 | 0.185 |
| 0.16 | 0.043 |
| 0.16 | 0.032 |
| 0.40 | 0.133 |
| 0.20 | 0.093 |
| 0.226 | 0.118 |
| 0.236 | 0.114 |
| 0.265 | 0.124 |
| 0.257 | 0.05 |

The iron remaining after the treatment with the aqueous solution of formic acid is practically all alloyed with the nickel in the powder. The purification process of the present invention effects the removal of mechanically mixed or free iron from nickel powder but it does not remove iron which is alloyed with the nickel.

As indicated above, the process of the invention can be carried out using 1 to 20% aqueous solutions of formic, acetic, lactic or tartaric acids. Attempts to use solutions of the common mineral acids—hydrochloric, sulfuric and nitric—in the process of the present invention were ineffectual since the degree of preferential attack on iron was negligible and definitely not enough to make practical a process for removing free iron from nickel without incurring large losses of nickel. Furthermore, other organic acids, such as oxalic and chloroacetic, have been found to have an insufficient preferential ability to dissolve iron in the presence of nickel to a degree practical for iron removal without excessive losses of nickel. The process of the present invention is predicated upon my discovery of the unique ability of formic, acetic, lactic and tartaric acid solutions to preferentially attack free iron in nickel powder. While 1 to 20% aqueous solutions of these four aliphatic acids may be employed, I prefer to use 2 to 5% aqueous solutions in the case of formic acid and 5 to 10% aqueous solutions in the case of acetic acid.

The nickel powder may be treated with the acid solution at any temperature in the range from 20 to 100° C. However, because of filtration difficulties and abnormal nickel losses, 35° C. is considered to be the maximum practical temperature. At room temperature a 5% formic acid solution will remove iron from a nickel powder in 1 to 2 hours with a nickel loss of 1–3%, whereas at 80 to 100° C., the iron is removed in 5 to 15 minutes but with an increased nickel loss of 5–10%. Apparently the nickel loss is caused by the acid solution attacking nickel oxide which accompanies the nickel powder. Iron removal drops off rapidly if the acid solution is colder than 20° C.

In order to remove the free iron it is necessary to wash the nickel powder with the aliphatic acid solution for from a minimum of 1½ hours to a maximum of 2½ hours. If the powder is washed for an excessive length of time, it will lead to difficulties in filtration. Longer treatments than 2½ hours dissolve more nickel but do not lower the iron content of the powder.

When using a 5% aqueous solution of formic acid, powder-liquid ratios ranging from 1:1 to 1:3 by weight are practical. The pulp ratio of solid to liquid by weight is best between 3:4 and 1:2. Higher liquid ratios result in filtration difficulties because of liquid load.

When using a 5% aqueous formic acid solution, the pH will usually be about 1.8 when the washing operation is started. Care must be taken to maintain the pH below 3.5, since at pH values above 3.5 iron in the form of ferric hydroxide will precipitate on the nickel. If because of process difficulties the nickel powder is exposed too long to the acid, the pH will rise and more acid will have to be added.

Drying of the washed and filtered or centrifuged powder can be accomplished in 5 to 10 hours in a 1 inch bed in a vacuum or airstream drier at 125–150° C., or in 5 to 15 minutes in a ¼ inch layer on a canvas belt in an infra-red tunnel with moderate air circulation.

Resort may be had to such modifications and variations as fall within the spirit of the invention and the scope of the appended claims.

I claim:

1. A process of removing free iron from nickel powder which comprises washing said nickel powder with a 1 to 20% solution of an organic acid selected from the group consisting of formic acid, acetic acid, lactic acid, and tartaric acid at a temperature in the range from 20 to 100° C., and then removing the wash solution from the nickel powder.

2. A process of removing free iron from a mechanically ground nickel powder which comprises washing said nickel powder with a 2 to 5% aqueous solution of formic acid at a temperature in the range from 20 to 35° C. for 1½ to 2½ hours, and then removing the formic acid solution by filtering the slurry.

3. A process as defined in claim 2 wherein the powder to liquid ratios range from 1:1 to 1:3 by weight.

References Cited in the file of this patent

Analytical Chemistry by Treadwell-Hall, vol. 2, 7th ed., pub. by John Wiley & Sons (1930), page 168.

Iron Age (May 8, 1947), page 66.